(12) United States Patent
Chui et al.

(10) Patent No.: US 7,310,179 B2
(45) Date of Patent: Dec. 18, 2007

(54) METHOD AND DEVICE FOR SELECTIVE ADJUSTMENT OF HYSTERESIS WINDOW

(75) Inventors: Clarence Chui, San Mateo, CA (US); Manish Kothari, Cupertino, CA (US)

(73) Assignee: IDC, LLC, San Fancisco, CA (US)

( * ) Notice: Subject to any disclaimer, the term of this patent is extended or adjusted under 35 U.S.C. 154(b) by 274 days.

(21) Appl. No.: 11/193,012

(22) Filed: Jul. 29, 2005

(65) Prior Publication Data

US 2006/0077520 A1 Apr. 13, 2006

Related U.S. Application Data

(60) Provisional application No. 60/613,382, filed on Sep. 27, 2004.

(51) Int. Cl.
*G02B 26/00* (2006.01)
*H01L 29/84* (2006.01)

(52) U.S. Cl. ............... 359/290; 359/291; 257/415; 333/262; 356/450; 307/401

(58) Field of Classification Search ............ 359/290, 359/291, 298, 239, 250, 260, 278; 257/415, 257/417, 701, 747; 333/262, 105; 356/450, 356/503, 504; 307/401; 250/214.1, 214 LS; 385/147; 438/22, 46, 48, 52, 222; 372/20, 372/50, 96; 345/32, 84, 85, 540

See application file for complete search history.

(56) References Cited

U.S. PATENT DOCUMENTS 3,476,951 A * 11/1969 Pulvari .................. 307/401

3,813,144 A * 5/1974 Kumada et al. ............ 359/250

(Continued)

FOREIGN PATENT DOCUMENTS

EP        0295802 A       12/1988

(Continued)

OTHER PUBLICATIONS

Bains, "Digital Paper Display Technology holds Promise for Portables", CommsDesign EE Times (2000).

(Continued)

*Primary Examiner*—Loha Ben
(74) *Attorney, Agent, or Firm*—Knobbe Martens Olson & Bear, LLP

(57) ABSTRACT

The width and location of a hysteresis window of an interferometric modulator may be altered by adjusting various physical characteristics of the interferometric modulator. Thus, depending on the particular application for which the interferometric modulators are manufactured, the width and location of the hysteresis window may be altered. For example, in some applications, reducing the power required to operate an array of interferometric modulators may be an important consideration. In other applications, the speed of the interferometric modulators may be of more importance, where the speed of an interferometric modulator, as used herein, refers to the speed of actuating and relaxing the moveable mirror. In other applications, the cost and ease of manufacturing may be of most importance. Systems and methods are introduced that allow selection of a width and location of a hysteresis window by adjusting various physical characteristics.

27 Claims, 14 Drawing Sheets

U.S. PATENT DOCUMENTS

| | | |
|---|---|---|
| 3,982,239 A | 9/1976 | Sherr |
| 4,403,248 A | 9/1983 | te Velde |
| 4,441,791 A | 4/1984 | Hornbeck |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,681,403 A | 7/1987 | te Velde et al. |
| 4,709,995 A | 12/1987 | Kuribayashi et al. |
| 4,710,732 A | 12/1987 | Hornbeck |
| 4,856,863 A | 8/1989 | Sampsell et al. |
| 4,859,060 A | 8/1989 | Katagiri et al. |
| 4,954,789 A | 9/1990 | Sampsell |
| 4,956,619 A | 9/1990 | Hornbeck |
| 4,982,184 A | 1/1991 | Kirkwood |
| 5,018,256 A | 5/1991 | Hornbeck |
| 5,028,939 A | 7/1991 | Hornbeck et al. |
| 5,037,173 A | 8/1991 | Sampsell et al. |
| 5,055,833 A | 10/1991 | Hehlen et al. |
| 5,061,049 A | 10/1991 | Hornbeck |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,142,414 A | 8/1992 | Koehler et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,227,900 A | 7/1993 | Inaba et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,287,215 A | 2/1994 | Warde et al. |
| 5,296,950 A | 3/1994 | Lin et al. |
| 5,305,640 A | 4/1994 | Boysel et al. |
| 5,312,513 A | 5/1994 | Florence et al. |
| 5,323,002 A | 6/1994 | Sampsell et al. |
| 5,325,116 A | 6/1994 | Sampsell |
| 5,327,286 A | 7/1994 | Sampsell et al. |
| 5,331,454 A | 7/1994 | Hornbeck |
| 5,339,116 A | 8/1994 | Urbanus et al. |
| 5,365,283 A | 11/1994 | Doherty et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,461,411 A | 10/1995 | Florence et al. |
| 5,488,505 A | 1/1996 | Engle |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,563,398 A | 10/1996 | Sampsell |
| 5,567,334 A | 10/1996 | Baker et al. |
| 5,570,135 A | 10/1996 | Gove et al. |
| 5,578,976 A | 11/1996 | Yao |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,598,565 A | 1/1997 | Reinhardt |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,612,713 A | 3/1997 | Bhuva et al. |
| 5,619,061 A | 4/1997 | Goldsmith et al. |
| 5,619,365 A | 4/1997 | Rhoades et al. |
| 5,619,366 A | 4/1997 | Rhoads et al. |
| 5,629,790 A | 5/1997 | Neukermans et al. |
| 5,633,652 A | 5/1997 | Kanbe et al. |
| 5,636,052 A | 6/1997 | Arney et al. |
| 5,638,084 A | 6/1997 | Kalt |
| 5,638,946 A | 6/1997 | Zavracky |
| 5,646,768 A | 7/1997 | Kaeriyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,745,193 A | 4/1998 | Urbanus et al. |
| 5,745,281 A | 4/1998 | Yi et al. |
| 5,754,160 A | 5/1998 | Shimizu et al. |
| 5,771,116 A | 6/1998 | Miller et al. |
| 5,784,189 A | 7/1998 | Bozler et al. |
| 5,784,212 A | 7/1998 | Hornbeck |
| 5,786,621 A * | 7/1998 | Saif et al. .................. 257/415 |
| 5,808,780 A | 9/1998 | McDonald |
| 5,818,095 A | 10/1998 | Sampsell |
| 5,835,255 A | 11/1998 | Miles |
| 5,842,088 A | 11/1998 | Thompson |
| 5,867,302 A | 2/1999 | Fleming et al. |
| 5,912,758 A | 6/1999 | Knipe et al. |
| 5,943,158 A | 8/1999 | Ford et al. |
| 5,959,763 A | 9/1999 | Bozler et al. |
| 5,966,235 A | 10/1999 | Walker et al. |
| 5,986,796 A | 11/1999 | Miles |
| 6,028,690 A | 2/2000 | Carter et al. |
| 6,038,056 A | 3/2000 | Florence et al. |
| 6,040,937 A | 3/2000 | Miles |

| | | | |
|---|---|---|---|
| 6,049,317 A | 4/2000 | Thompson et al. | |
| 6,055,090 A | 4/2000 | Miles | |
| 6,061,075 A | 5/2000 | Nelson et al. | |
| 6,099,132 A | 8/2000 | Kaeriyama | |
| 6,100,872 A | 8/2000 | Aratani et al. | |
| 6,113,239 A | 9/2000 | Sampsell et al. | |
| 6,147,790 A | 11/2000 | Meier et al. | |
| 6,160,833 A | 12/2000 | Floyd et al. | |
| 6,180,428 B1 | 1/2001 | Peeters et al. | |
| 6,201,633 B1 | 3/2001 | Peeters et al. | |
| 6,232,936 B1 | 5/2001 | Gove et al. | |
| 6,275,326 B1 | 8/2001 | Bhalla et al. | |
| 6,282,010 B1 | 8/2001 | Sulzbach et al. | |
| 6,295,154 B1 | 9/2001 | Laor et al. | |
| 6,304,297 B1 | 10/2001 | Swan | |
| 6,310,339 B1 * | 10/2001 | Hsu et al. | 250/214.1 |
| 6,323,982 B1 | 11/2001 | Hornbeck | |
| 6,327,071 B1 | 12/2001 | Kimura | |
| 6,356,085 B1 | 3/2002 | Ryat et al. | |
| 6,356,254 B1 | 3/2002 | Kimura | |
| 6,429,601 B1 | 8/2002 | Friend et al. | |
| 6,433,917 B1 | 8/2002 | Mei et al. | |
| 6,447,126 B1 | 9/2002 | Hornbeck | |
| 6,465,355 B1 | 10/2002 | Horsley | |
| 6,466,358 B2 | 10/2002 | Tew | |
| 6,473,274 B1 | 10/2002 | Maimone et al. | |
| 6,480,177 B2 | 11/2002 | Doherty et al. | |
| 6,496,122 B2 | 12/2002 | Sampsell | |
| 6,501,107 B1 | 12/2002 | Sinclair et al. | |
| 6,507,330 B1 | 1/2003 | Handschy et al. | |
| 6,507,331 B1 | 1/2003 | Schlangen et al. | |
| 6,545,335 B1 | 4/2003 | Chua et al. | |
| 6,548,908 B2 | 4/2003 | Chua et al. | |
| 6,549,338 B1 | 4/2003 | Wolverton et al. | |
| 6,552,840 B2 | 4/2003 | Knipe | |
| 6,574,033 B1 | 6/2003 | Chui et al. | |
| 6,589,625 B1 | 7/2003 | Kothari et al. | |
| 6,593,934 B1 | 7/2003 | Liaw et al. | |
| 6,600,201 B2 | 7/2003 | Hartwell et al. | |
| 6,606,175 B1 | 8/2003 | Sampsell et al. | |
| 6,625,047 B2 | 9/2003 | Coleman, Jr. | |
| 6,630,786 B2 | 10/2003 | Cummings et al. | |
| 6,632,698 B2 | 10/2003 | Ives | |
| 6,643,069 B2 | 11/2003 | Dewald | |
| 6,650,455 B2 | 11/2003 | Miles | |
| 6,666,561 B1 | 12/2003 | Blakley | |
| 6,674,090 B1 | 1/2004 | Chua et al. | |
| 6,674,562 B1 | 1/2004 | Miles | |
| 6,680,792 B2 | 1/2004 | Miles | |
| 6,710,908 B2 | 3/2004 | Miles et al. | |
| 6,741,377 B2 | 5/2004 | Miles | |
| 6,741,384 B1 | 5/2004 | Martin et al. | |
| 6,741,503 B1 | 5/2004 | Farris et al. | |
| 6,747,785 B2 | 6/2004 | Chen et al. | |
| 6,762,873 B1 | 7/2004 | Coker et al. | |
| 6,775,174 B2 | 8/2004 | Huffman et al. | |
| 6,778,155 B2 | 8/2004 | Doherty et al. | |
| 6,781,643 B1 | 8/2004 | Watanabe et al. | |
| 6,787,384 B2 | 9/2004 | Okumura | |
| 6,787,438 B1 | 9/2004 | Nelson | |
| 6,788,520 B1 | 9/2004 | Behin et al. | |
| 6,794,119 B2 | 9/2004 | Miles | |
| 6,811,267 B1 | 11/2004 | Allen et al. | |
| 6,813,060 B1 | 11/2004 | Garcia et al. | |
| 6,819,469 B1 | 11/2004 | Koba | |
| 6,822,628 B2 | 11/2004 | Dunphy et al. | |
| 6,829,132 B2 | 12/2004 | Martin et al. | |
| 6,853,129 B1 | 2/2005 | Cummings et al. | |
| 6,855,610 B2 | 2/2005 | Tung et al. | |
| 6,859,218 B1 | 2/2005 | Luman et al. | |
| 6,861,277 B1 | 3/2005 | Monroe et al. | |
| 6,862,022 B2 | 3/2005 | Slupe | |
| 6,862,029 B1 | 3/2005 | D'Souza et al. | |
| 6,867,896 B2 | 3/2005 | Miles | |
| 6,870,581 B2 | 3/2005 | Li et al. | |
| 6,882,256 B1 * | 4/2005 | Yip | 333/262 |
| 6,903,860 B2 | 6/2005 | Ishii | |
| 6,922,272 B1 * | 7/2005 | de Groot et al. | 359/291 |
| 2001/0003487 A1 | 6/2001 | Miles | |
| 2001/0034075 A1 | 10/2001 | Onoya | |
| 2001/0043171 A1 | 11/2001 | Van Gorkom et al. | |
| 2001/0046081 A1 | 11/2001 | Hayashi et al. | |
| 2001/0051014 A1 | 12/2001 | Behin et al. | |
| 2002/0000959 A1 | 1/2002 | Colgan et al. | |
| 2002/0005827 A1 | 1/2002 | Kobayashi | |
| 2002/0012159 A1 | 1/2002 | Tew | |
| 2002/0015215 A1 | 2/2002 | Miles | |
| 2002/0024711 A1 | 2/2002 | Miles | |
| 2002/0036304 A1 | 3/2002 | Ehmke et al. | |
| 2002/0050882 A1 | 5/2002 | Hyman et al. | |
| 2002/0054424 A1 | 5/2002 | Miles et al. | |
| 2002/0075226 A1 | 6/2002 | Lippincott | |
| 2002/0075555 A1 | 6/2002 | Miles | |
| 2002/0093722 A1 | 7/2002 | Chan et al. | |
| 2002/0097133 A1 | 7/2002 | Charvet et al. | |
| 2002/0126364 A1 | 9/2002 | Miles | |
| 2002/0179421 A1 | 12/2002 | Williams et al. | |
| 2002/0186108 A1 | 12/2002 | Hallbjorner | |
| 2003/0004272 A1 | 1/2003 | Power | |
| 2003/0043157 A1 | 3/2003 | Miles | |
| 2003/0072070 A1 | 4/2003 | Miles | |
| 2003/0122773 A1 | 7/2003 | Washio et al. | |
| 2003/0137215 A1 | 7/2003 | Cabuz | |
| 2003/0137521 A1 | 7/2003 | Zehner et al. | |
| 2003/0189536 A1 | 10/2003 | Ruigt | |
| 2003/0202264 A1 | 10/2003 | Weber et al. | |
| 2003/0202265 A1 | 10/2003 | Reboa et al. | |
| 2003/0202266 A1 | 10/2003 | Ring et al. | |
| 2004/0008396 A1 | 1/2004 | Stappaerts | |
| 2004/0022044 A1 | 2/2004 | Yasuoka et al. | |
| 2004/0027701 A1 | 2/2004 | Ishikawa | |
| 2004/0051929 A1 | 3/2004 | Sampsell et al. | |
| 2004/0058532 A1 | 3/2004 | Miles et al. | |
| 2004/0080807 A1 | 4/2004 | Chen et al. | |
| 2004/0145049 A1 | 7/2004 | McKinnell et al. | |
| 2004/0147056 A1 | 7/2004 | McKinnell et al. | |
| 2004/0160143 A1 | 8/2004 | Shreeve et al. | |
| 2004/0174583 A1 | 9/2004 | Chen et al. | |
| 2004/0179281 A1 | 9/2004 | Reboa | |
| 2004/0212026 A1 | 10/2004 | Van Brocklin et al. | |
| 2004/0217378 A1 | 11/2004 | Martin et al. | |
| 2004/0217919 A1 | 11/2004 | Pichl et al. | |
| 2004/0218251 A1 | 11/2004 | Piehl et al. | |
| 2004/0218334 A1 | 11/2004 | Martin et al. | |
| 2004/0218341 A1 | 11/2004 | Martin et al. | |
| 2004/0223204 A1 | 11/2004 | Mao et al. | |
| 2004/0227493 A1 | 11/2004 | Van Brocklin et al. | |
| 2004/0240032 A1 | 12/2004 | Miles | |
| 2004/0240138 A1 | 12/2004 | Martin et al. | |
| 2004/0245588 A1 | 12/2004 | Nikkel et al. | |
| 2004/0263944 A1 | 12/2004 | Miles et al. | |
| 2005/0001828 A1 | 1/2005 | Martin et al. | |
| 2005/0012577 A1 | 1/2005 | Pillans et al. | |
| 2005/0038950 A1 | 2/2005 | Adelmann | |
| 2005/0057442 A1 | 3/2005 | Way | |
| 2005/0068583 A1 | 3/2005 | Gutkowski et al. | |
| 2005/0069209 A1 | 3/2005 | Damera-Venkata et al. | |
| 2005/0116924 A1 | 6/2005 | Sauvante et al. | |
| 2005/0206991 A1 | 9/2005 | Chui et al. | |
| 2005/0286113 A1 | 12/2005 | Miles | |
| 2005/0286114 A1 | 12/2005 | Miles | |
| 2006/0044246 A1 | 3/2006 | Mignard | |
| 2006/0044298 A1 | 3/2006 | Mignard et al. | |
| 2006/0044928 A1 | 3/2006 | Chui et al. | |
| 2006/0056000 A1 | 3/2006 | Mignard | |
| 2006/0057754 A1 | 3/2006 | Cummings |

| | | | |
|---|---|---|---|
| 2006/0066542 A1 | 3/2006 | Chui | |
| 2006/0066559 A1 | 3/2006 | Chui et al. | |
| 2006/0066560 A1 | 3/2006 | Gally et al. | |
| 2006/0066561 A1 | 3/2006 | Chui et al. | |
| 2006/0066594 A1 | 3/2006 | Tyger | |
| 2006/0066597 A1 | 3/2006 | Sampsell | |
| 2006/0066598 A1 | 3/2006 | Floyd | |
| 2006/0066601 A1 | 3/2006 | Kothari | |
| 2006/0066937 A1 | 3/2006 | Chui | |
| 2006/0066938 A1 | 3/2006 | Chui | |
| 2006/0067648 A1 | 3/2006 | Chui et al. | |
| 2006/0067653 A1 | 3/2006 | Gally et al. | |
| 2006/0077127 A1 | 4/2006 | Sampsell et al. | |
| 2006/0077505 A1 | 4/2006 | Chui et al. | |
| 2006/0103613 A1 | 5/2006 | Chui | |

FOREIGN PATENT DOCUMENTS

| | | |
|---|---|---|
| EP | 0300754 A2 | 1/1989 |
| EP | 0306308 A2 | 3/1989 |
| EP | 0318050 A | 5/1989 |
| EP | 0 417 523 A | 3/1991 |
| EP | 0 467 048 A | 1/1992 |
| EP | 0570906 A | 11/1993 |
| EP | 0608056 A1 | 7/1994 |
| EP | 0655725 A1 | 5/1995 |
| EP | 0 667 548 A1 | 8/1995 |
| EP | 0725380 A1 | 8/1996 |
| EP | 0852371 A1 | 7/1998 |
| EP | 0911794 A1 | 4/1999 |
| EP | 1 017 038 A | 7/2000 |
| EP | 1 146 533 A | 10/2001 |
| EP | 1343190 A | 9/2003 |
| EP | 1345197 A | 9/2003 |
| EP | 1381023 A | 1/2004 |
| EP | 1473691 A2 | 11/2004 |
| GB | 2401200 A | 11/2004 |
| JP | 2004-29571 | 1/2004 |
| WO | WO 95/30924 | 11/1995 |
| WO | WO 97/17628 | 5/1997 |
| WO | WO 99/52006 A3 | 10/1999 |
| WO | WO 01/73937 A | 10/2001 |
| WO | WO 03/007049 A1 | 1/2003 |
| WO | WO 03/015071 A2 | 2/2003 |
| WO | WO 03/044765 A2 | 5/2003 |
| WO | WO 03/060940 A | 7/2003 |
| WO | WO 03/069413 A1 | 8/2003 |
| WO | WO 03/073151 A1 | 9/2003 |
| WO | WO 03/079323 A | 9/2003 |
| WO | WO 03/090199 A1 | 10/2003 |
| WO | WO 2004/006003 A1 | 1/2004 |
| WO | WO 2004/026757 A2 | 4/2004 |
| WO | WO 2004/049034 A1 | 6/2004 |

OTHER PUBLICATIONS

Lieberman, "MEMS Display Looks to give PDAs Sharper Image" EE Times (2004).

Lieberman, "Microbridges at heart of new MEMS displays" EE Times (2004).

Seeger et al., "Stabilization of Electrostatically Actuated Mechanical Devices", (1997) International Conference on Solid State Sensors and Actuators; vol. 2, pp. 1133-1136.

Peroulis et al., Low contact resistance series MEMS switches, 2002, pp. 223-226, vol. 1, IEEE MTT-S International Microwave Symposium Digest, New York, NY.

International Preliminary Report on Patentability dated Jul. 19, 2007.

Partial International Search Report dated Aug. 23, 2007.

* cited by examiner

|  | Column Output Signals | |
|---|---|---|
|  | $+V_{bias}$ | $-V_{bias}$ |
| Row Output Signals    0 | Stable | Stable |
| $+\Delta V$ | Relax | Actuate |
| $-\Delta V$ | Actuate | Relax |

*Power Optimized - (Actuated:4V Relaxed:2V)*

*Speed Optimized - (Actuated:8V Relaxed:6V)*

Optimized for Manufacturing Ease - (Actuated:2V Relaxed:8V)

METHOD AND DEVICE FOR SELECTIVE ADJUSTMENT OF HYSTERESIS WINDOW

RELATED APPLICATIONS

This application claims priority under 35 U.S.C. § 119(e) to U.S. Provisional Application Ser. No. 60/613,382, filed on Sep. 27, 2004, which is hereby expressly incorporated by reference in its entirety.

FIELD OF THE INVENTION

The field of the invention relates to microelectromechanical systems (MEMS).

DESCRIPTION OF THE RELATED TECHNOLOGY

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one embodiment, an interferometric display element may be optimized for at least one of (a) low power consumption, (b) speed, and (c) ease of manufacturing, wherein the interferometric modulator comprises a moveable reflective layer, a reflective element coupled to the moveable layer, a partially reflective layer, and a dielectric layer positioned between the moveable reflective layer and the partially reflective layer, the moveable reflective layer being suspended away from the partially reflective layer by one or more supports so as to define a cavity between the moveable reflective layer and the dielectric. In one embodiment, the method comprises selecting one or more characteristics of at least one of a support thickness, a support width, a dielectric layer thickness, a moveable layer thickness, a moveable layer width, a moveable layer material, and a moveable layer stress level, wherein the selected one or more characteristics define one or more of an actuation voltage threshold, a release relax threshold voltage, and a voltage difference between an the actuation and release relax thresholds voltage of the interferometric display element, and manufacturing the interferometric display element to include the selected one or more characteristic.

In another embodiment, an interferometric modulator may be manufactured by the process of selecting one or more characteristics of at least one of a support thickness, a support width, a dielectric layer thickness, a moveable layer thickness, a moveable layer width, a moveable layer material, and a moveable layer stress level, wherein the selected one or more characteristics define one or more of an actuation voltage threshold, a release relax voltage threshold, and a voltage difference between an the actuation and release relax voltage thresholds of the interferometric display element, and manufacturing the interferometric display element to include the selected one or more characteristic.

In another embodiment, a method of defining characteristics for a hysteresis window of an interferometric display element comprises selecting values for at least one of a thickness of a moveable layer portion of the display element, a thickness of a dielectric layer positioned between a moveable layer and a partially reflective layer, a spacing between supports configured to define a gap between the moveable layer and the partially reflective layer, and a gap distance between the moveable layer and the partially reflective layer, wherein a display element produced with said values exhibits said defined hysteresis window characteristics.

In another embodiment, a method of manufacturing an interferometric modulator to incorporate selected characteristics comprises selecting values representative of interferometric modulator component characteristics, wherein the characteristics define an expected relax threshold and an expected actuation threshold of the interferometric modulator, and manufacturing the interferometric modulator by use of the selected values such that a relax threshold and an actuation threshold of the manufactured interferometric modulator are substantially equal to the expected relax and actuation threshold, respectively.

In another embodiment, a display element optimized for speed comprises a reflective moveable layer having a thickness in the range of about 2,500 to 5,000 Angstroms and a tensile stress in the range of about 350 to 700 MPascals, a partially reflective layer, a dielectric material positioned between the reflective moveable layer and the partially reflective layer, and supports positioned between the reflective moveable layer and the dielectric material and configured to define a gap between the reflective moveable layer and the partially reflective layer.

In another embodiment, a low power display element comprises a reflective moveable layer having a thickness in the range of about 800 to 1,500 Angstroms and a tensile stress in the range of about 50 to 350 MPascals, a partially reflective layer, a dielectric material positioned between the reflective moveable layer and the partially reflective layer, and supports positioned between the reflective moveable layer and the dielectric material and configured to define a gap between the reflective moveable layer and the partially reflective layer.

In another embodiment, a display element comprises a reflective moveable layer, an optical stack comprising a partially reflective layer and an electrically conductive layer, wherein a center portion of the electrically conductive area is electrically isolated from peripheral portions of the electrically conductive area, a dielectric material positioned between the reflective moveable layer and the partially reflective layer, and supports positioned between the reflective moveable layer and the dielectric material and configured to define a gap between the reflective moveable layer and the partially reflective layer.

In another embodiment, an interferometric modulator comprises means for selecting values representative of interferometric modulator component characteristics, wherein the characteristics define an expected relax threshold and an expected actuation threshold of the interferometric modulator, and means for manufacturing the interferometric modulator by use of the selected values such that a relax threshold and an actuation threshold of the manufactured interferometric modulator are substantially equal to the expected relax and actuation threshold, respectively.

In another embodiment, an apparatus comprises a display comprising a reflective moveable layer having a thickness in the range of about 800 to 1,500 Angstroms and a tensile stress in the range of about 50 to 350 MPascals, a partially reflective layer, a dielectric material positioned between the reflective moveable layer and the partially reflective layer, and supports positioned between the reflective moveable layer and the dielectric material and configured to define a gap between the reflective moveable layer and the partially reflective layer. In one embodiment, the apparatus further comprises a processor that is in electrical communication with said display, said processor being configured to process image data, and a memory device in electrical communication with said processor.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

The width and location of a hysteresis window of an interferometric modulator may be altered by adjusting various physical characteristics of the interferometric modulator. Thus, depending on the particular application for which the interferometric modulators are manufactured, the width and location of the hysteresis window may be altered. For example, in some applications, reducing the power required to operate an array of interferometric modulators may be an important consideration. In other applications, the speed of the interferometric modulators may be of more importance, where the speed of an interferometric modulator, as used herein, refers to the speed of actuating and relaxing the moveable mirror. In other applications, the cost and ease of manufacturing may be of most importance. Systems and methods are introduced that allow selection of a width and location of a hysteresis window by adjusting various physical characteristics.

Figure 1:
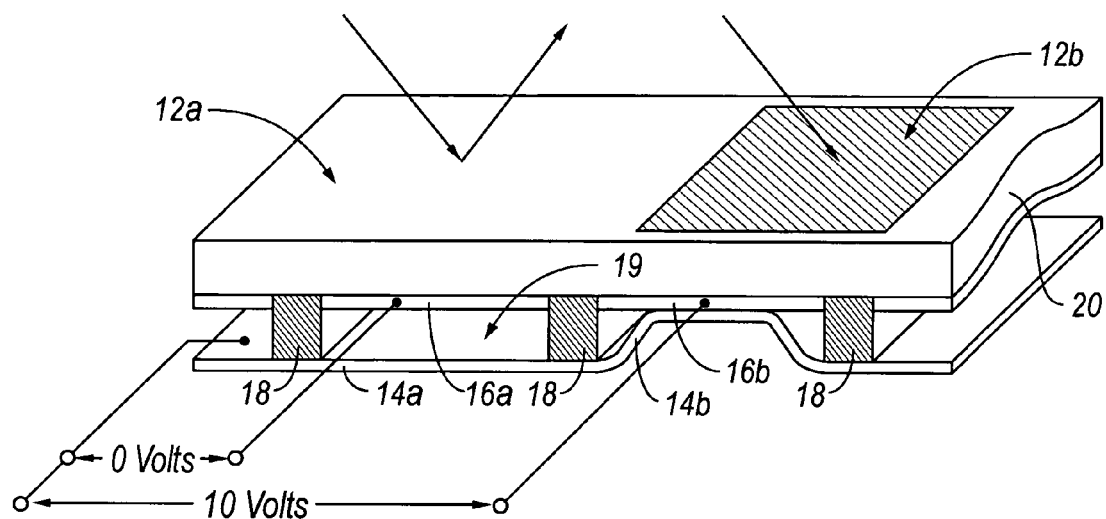
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
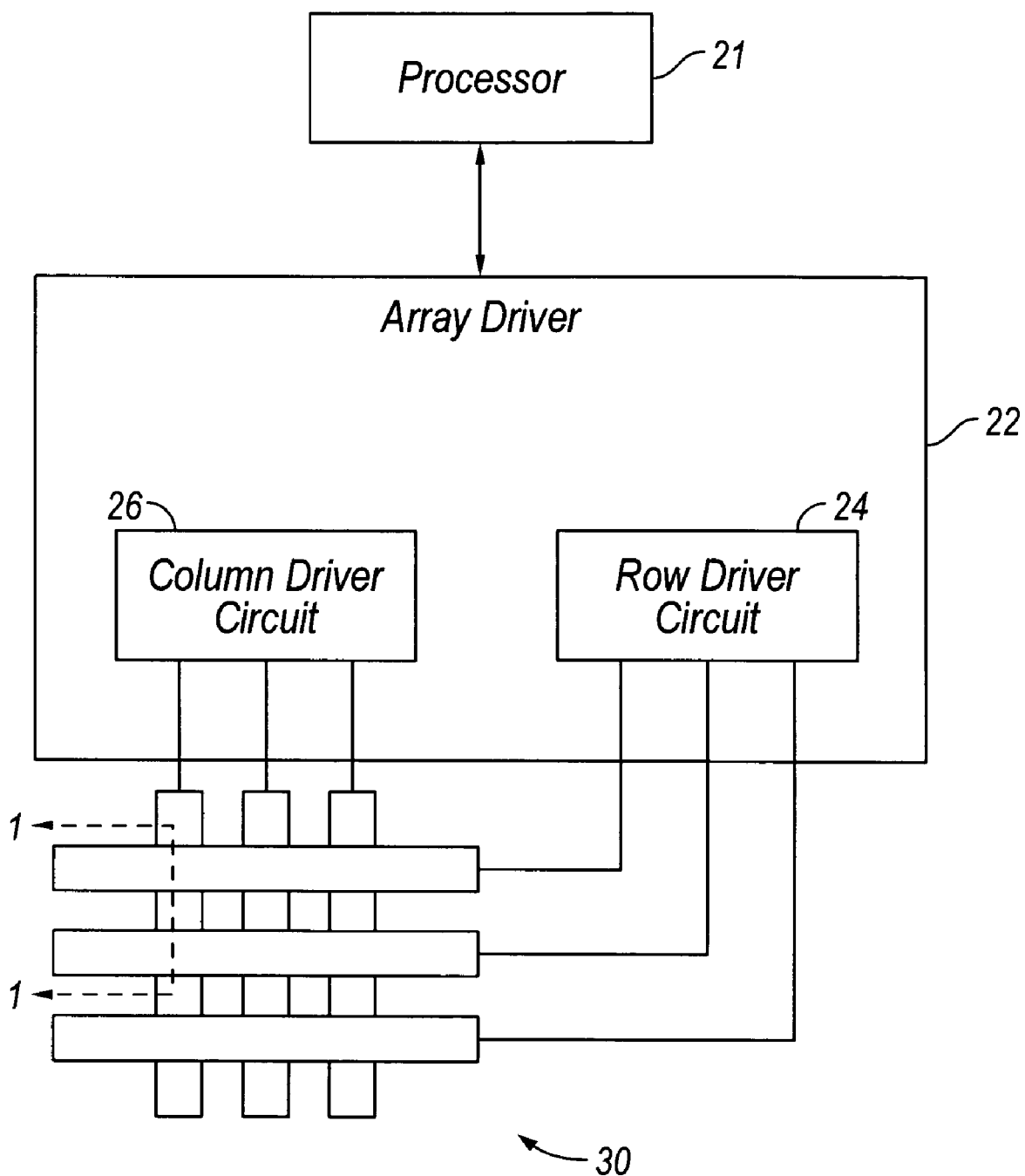
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
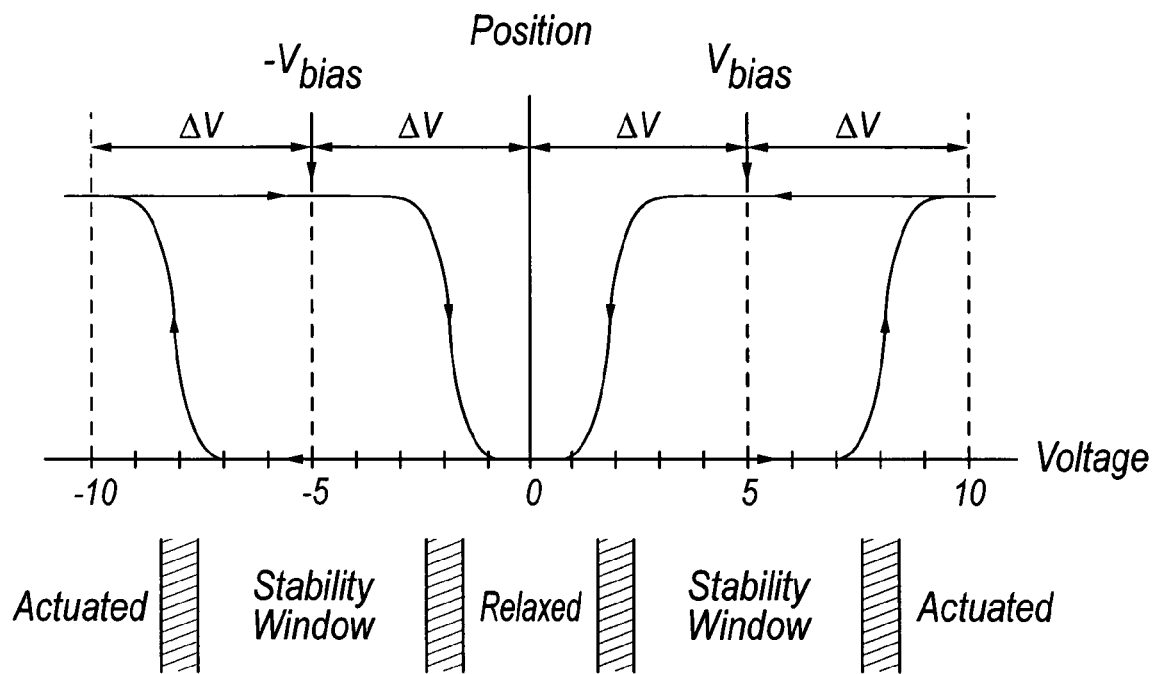
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
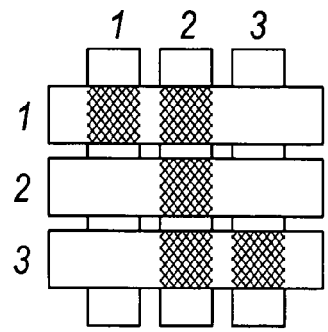
FIGS. 5A and 5B illustrate one exemplary timing diagram for row and column signals that may be used to write a frame of display data to the 3×3 interferometric modulator display of FIG. 2.
Figure 5B:
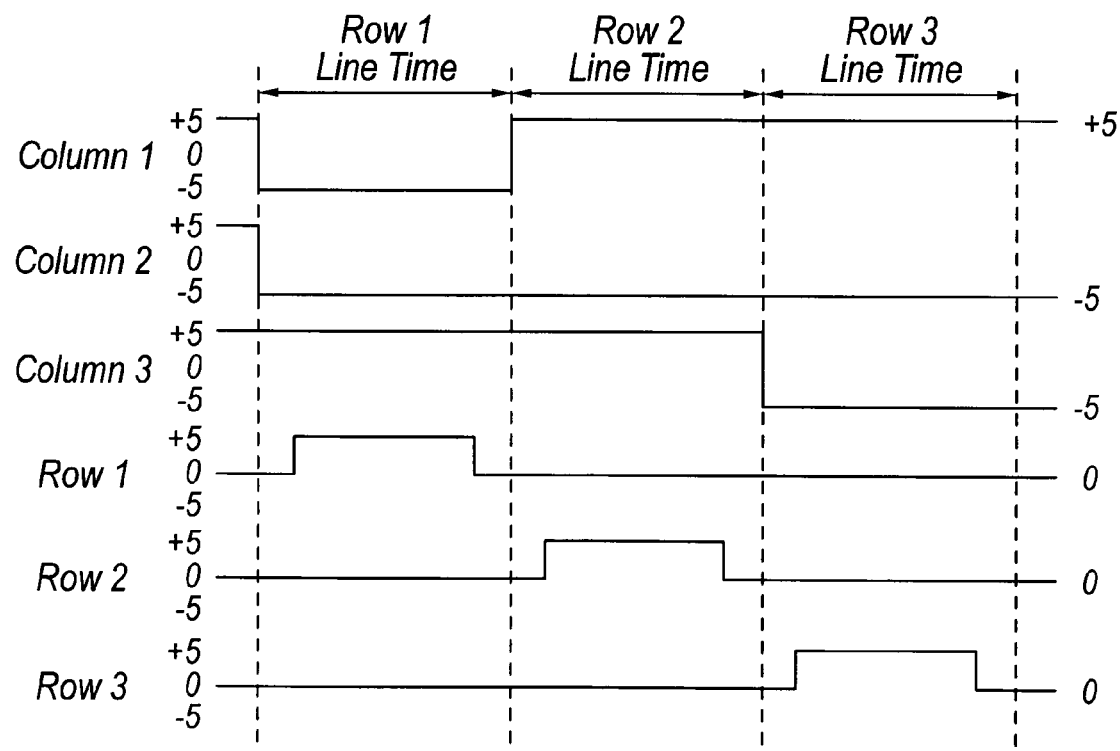

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
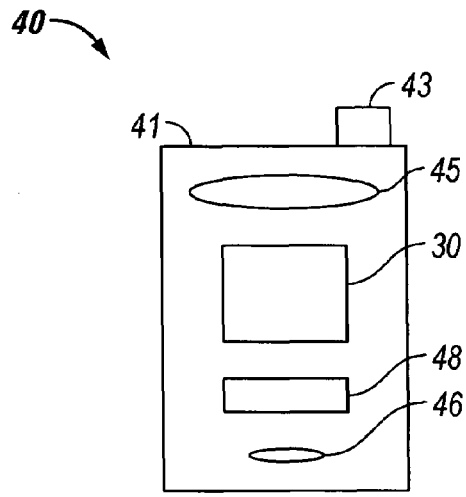
FIGS. 6A and 6B are system block diagrams illustrating an embodiment of a visual display device comprising a plurality of interferometric modulators.
Figure 6B:
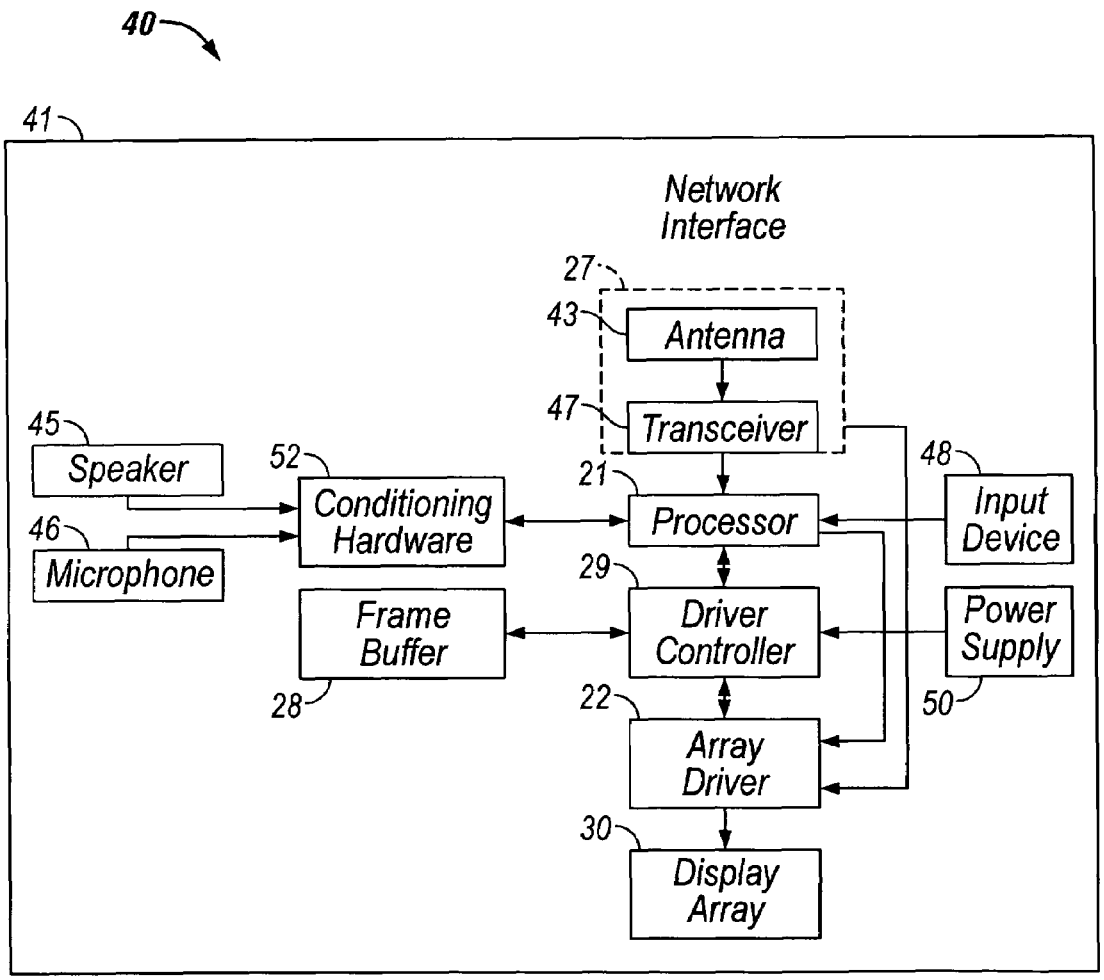

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
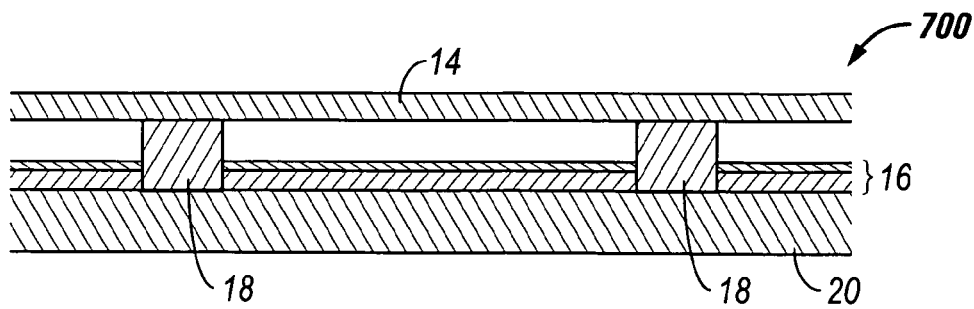
FIG. 7A is a cross sectional view of the device of FIG. 1.
Figure 7B:
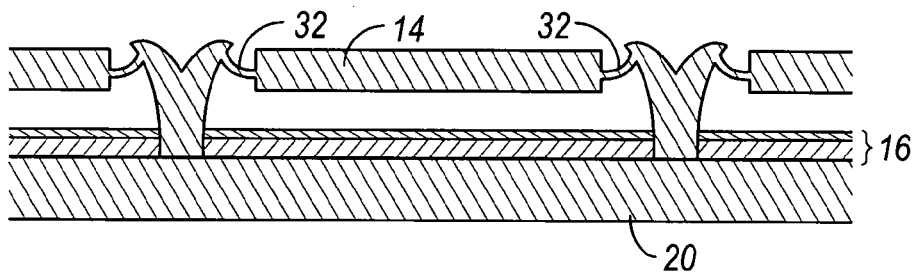
FIG. 7B is a cross sectional view of an alternative embodiment of an interferometric modulator.
Figure 7C:
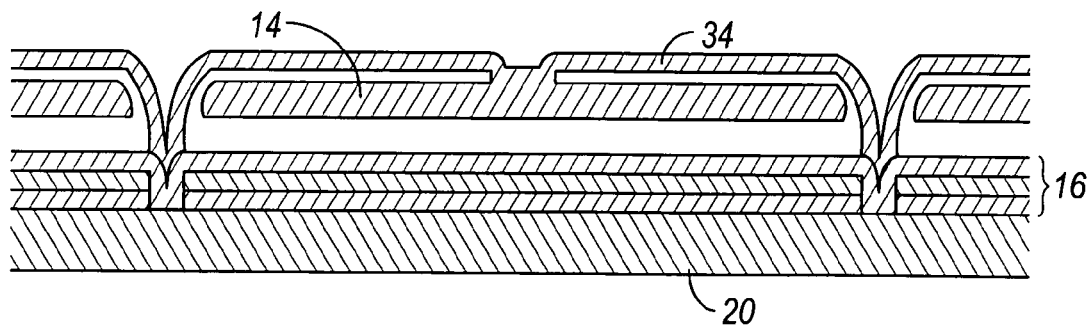
FIG. 7C is a cross sectional view of another alternative embodiment of an interferometric modulator.
Figure 7D:
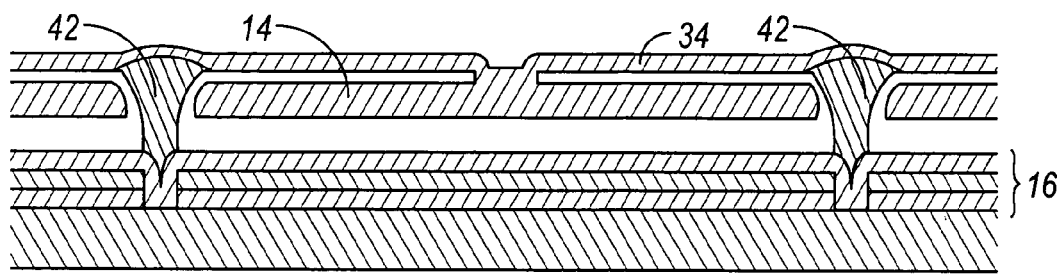
FIG. 7D is a cross sectional view of yet another alternative embodiment of an interferometric modulator.
Figure 7E:
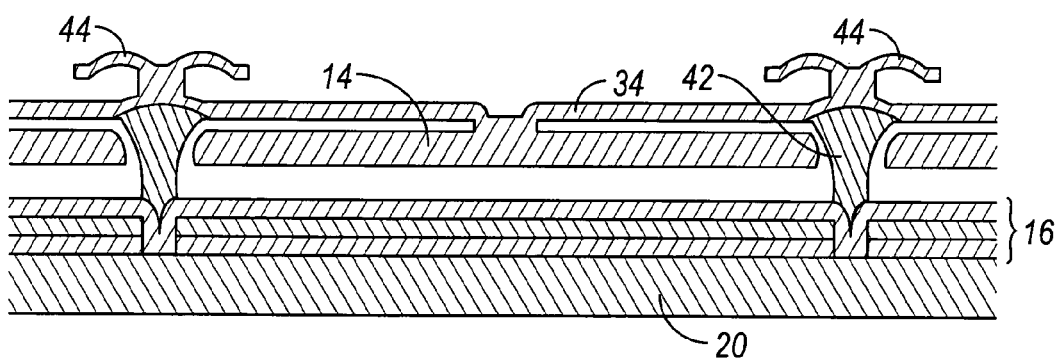
FIG. 7E is a cross sectional view of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the comers only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
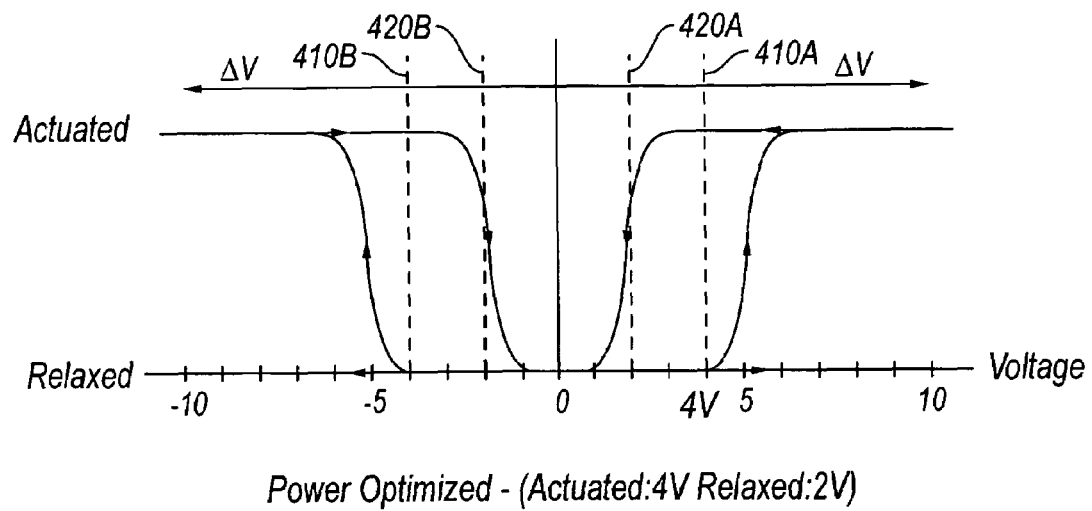
FIG. 8 is a diagram of movable mirror position versus applied voltage for an exemplary interferometric modulator optimized for reduced power consumption.
Figure 9:
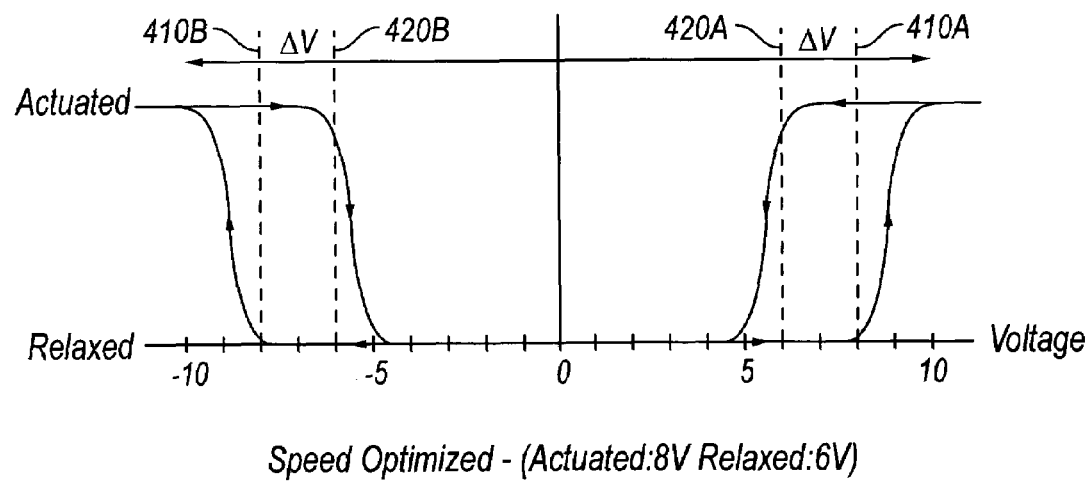
FIG. 9 is a diagram of movable mirror position versus applied voltage for an exemplary interferometric modulator optimized for speed.
Figure 10:
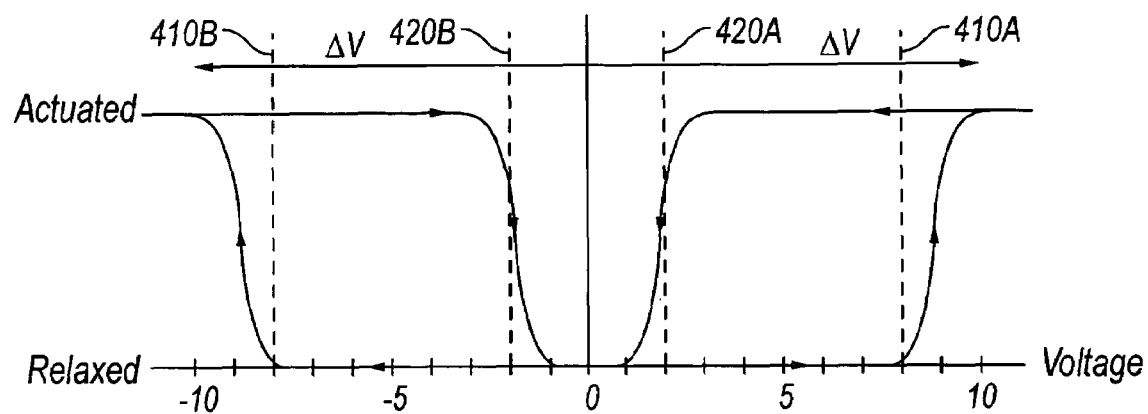
FIG. 10 is a diagram of movable mirror position versus applied voltage for an exemplary interferometric modulator optimized for ease of manufacturing.

FIGS. 8-10 are each graphs illustrating the stability window for three exemplary interferometric modulators. As described above with reference to FIG. 3, a stability window (also referred to herein as a hysteresis window) is the range of applied voltages within which the interferometric modulator is stable in either the relaxed or actuated state. In FIGS. 8-10, the horizontal axes represent voltage differences between a column voltage $V_2$ and a row voltage $V_1$ that are applied to an interferometric modulator. The term "applied voltage," as used herein, is defined as the voltage difference $V_2-V_1$. In one embodiment, the column voltage $V_2$ is applied to a mechanical layer of an interferometric modulator, such as the substrate 12 of FIG. 1, and the row voltage $V_1$ is applied to an optical layer of an interferometric modulator, such as the optical layer 16 of FIG. 1. Thus, a voltage difference is created across the cavity 19. In one embodiment, when the applied voltage increases from about zero volt to an actuation threshold 410A (FIGS. 8-10), the moveable reflective layer 14 deforms towards the optical stack 16 (FIG. 7A). This actuated state is maintained until the applied voltage drops below a relax threshold 420A.

As shown in the embodiments of FIGS. 8-10, applied voltages of positive or negative polarity may be used to actuate and relax interferometric modulators. For example, when the applied voltage decreases from about zero volt to an actuation threshold 410B (FIGS. 8-10), the moveable reflective layer 14 deforms towards the optical stack 16 (FIG. 7A). This actuated state is maintained until the applied voltage increase above a relax threshold 420B. For ease of description, the following description refers to positive applied voltages that reach the positive thresholds 410A, 420A. However, it is expressly contemplated that negative applied voltages may be used to produce similar results.

As used herein, the terms actuation and relax threshold refer to the applied voltages that cause an interferometric modulator to actuate and relax, respectively. More particularly, the actuation thresholds 410A, 410B are the applied voltages necessary to actuate an interferometric modulator, and the relax thresholds 420A, 420B are the applied voltages necessary to relax an interferometric modulator. When considering an array of interferometric modulators, the actuation threshold is the lowest applied voltage at which one of the interferometric modulators in the array begins to actuate (close) and the relax threshold is the highest applied voltage at which one of the interferometric modulators in the array begins to relax (open).

As those of skill in the art will recognize, the width and location of the hysteresis window on the horizontal axis of the graphs in FIGS. 3, and 8-10 may affect the performance of the interferometric modulator. Thus, depending on the particular application for which the interferometric modulators are manufactured, the width and location of the hysteresis window may be altered. For example, in some applications, reducing the power required to operate an array of interferometric modulators may be an important consideration. In other applications, the speed of the interferometric modulators may be of more importance, where the speed of an interferometric modulator, as used herein, refers to the speed of actuating and relaxing the moveable mirror. In other applications, the cost and ease of manufacturing may be of most importance. Accordingly, it may be desirable to manufacture interferometric modulators having relax and actuation thresholds (collectively, "the thresholds") selected for the particular application in which the interferometric modulators are to be implemented. According to the systems and methods described herein, the location of the thresholds and thus, the width and location of the hysteresis window, may be selected by adjusting certain physical characteristics of an interferometric modulator.

FIG. 8 is a diagram of movable mirror positions versus applied voltage for an exemplary interferometric modulator optimized for reduced power consumption. As illustrated in FIG. 8, the actuation threshold 410A is above about 4 V and the relax threshold 420A is below about 2 V. Accordingly, in order to actuate an interferometric modulator that is currently in the relaxed state, a voltage difference of at least 4 V should be applied between the movable mirror and the optical stack. After applying at least the actuation voltage, the interferometric modulator may remain in the actuated state so long as the applied voltage ($\Delta V$) remains in the range of about 2-4 V. When the applied voltage drops below about 2 V, the interferometric modulator returns to the relaxed state. The interferometric modulator will then remain in the relaxed state while the applied voltage remains below the actuation voltage, e.g., 4V. Because the voltage required to reach the actuation threshold is lower than in the exemplary embodiment of FIG. 3, and due to the proportional relationship of voltage to power (Power=Capacitance*Voltage*Voltage*Frequency), the power required to actuate the interferometric modulator having the hysteresis window of FIG. 8 is less than for an interferometric modulator having the hysteresis window of FIG. 3. As described in further detail below, various manufacturing considerations may be implemented in order to reduce the thresholds and, thus, provide a reduced power interferometric modulator. In an exemplary embodiment, an interferometric modulator that has been optimized for reduced power has an actuation threshold in one of the ranges: 3.8-4.2 volts, 3.5-4.5 volts, 3-5 volts, or 2.5-5.5 volts and a relax threshold in one of the ranges: 1.8-2.2 volts, 1.5-2.5 volts, or 1-3 volts. In one embodiment, a speed-optimized interferometric modulator has a reflective moveable layer with a thickness in the range of about 2,500 to 5,000 Angstroms and a tensile stress in the range of about 350 to 700 MPascals.

FIG. 9 is a diagram of movable mirror positions versus applied voltage for an exemplary interferometric modulator optimized for speed. As illustrated in FIG. 9, the actuation threshold 410A is above about 8 V and the relax threshold 420A is below about 6 V. Accordingly, in order to actuate an interferometric modulator that is currently in the relaxed state, an applied voltage of at least 8 V should be applied between the movable mirror and the optical stack. After application of an applied voltage of more than about 8 V, the interferometric modulator may remain in the actuated state so long as the applied voltage remains in the range of about 6-8 V. When the applied voltage drops below about 6 V, the interferometric modulator returns to the relaxed state. The interferometric modulator will then remain in the relaxed state while the applied voltage remains below the actuation threshold, e.g., 8V. Because the actuation and relax thresholds are higher than the thresholds in exemplary FIG. 3, a higher applied voltage is used to actuate the interferometric modulator. Accordingly, at this higher applied voltage, an increased force will be generated between the moveable mirror and the optical stack, causing the moveable mirror to be actuated more quickly than a moveable mirror in an interferometric modulator having the hysterisis window of FIG. 3. As described in further detail below, various manufacturing considerations may be implemented in order to increase at least the actuation threshold and, thus, provide an interferometric modulator with an increased actuation speed. In one embodiment, the actuation threshold of an interferometric modulator that has been optimized for speed is in one of the ranges: 7.8-8.2 volts, 7.5-8.5 volts, 7-9 volts, or 6-10 volts. In one embodiment, the relax threshold of an interferometric modulator that has been optimized for reduced power is in one of the ranges: 5.8-6.2 volts, 5.5-6.5 volts, or 4-8 volts. In one embodiment, a low power interferometric modulator has a reflective moveable layer with a thickness in the range of about 800 to 1,500 Angstroms and a tensile stress in the range of about 50 to 350 MPascals.

FIG. 10 is a diagram of movable mirror positions versus applied voltage for an exemplary interferometric modulator optimized for ease of manufacturing. As illustrated in FIG. 10, the actuation threshold 410A is above about 8 V and the relax threshold 420A is below about 2 V. Accordingly, in order to actuate an interferometric modulator that is currently in the relaxed state, an applied voltage of at least 8 V should be applied between the movable mirror and the optical stack. After application of an applied voltage of more than about 8 V, the interferometric modulator may remain in the actuated state so long as the applied voltage remains in the range of about 2-8 V. When the applied voltage drops below the relax threshold 420A of about 2 V, the interferometric modulator returns to the relaxed state. The interferometric modulator will then remain in the relax state while the applied voltage remains below the actuation threshold, e.g., 8V.

As illustrated in FIG. 10, the actuation threshold is higher and the hysteresis window is wider than in exemplary FIG. 3. Thus, the range of applied voltages in which a state of an interferometric modulator may be maintained is large, e.g., 6 Volts in FIG. 10. With a larger range for maintaining an interferometric modulator state, the manufacturing process requires less stringent manufacturing constraints and less expensive materials than are necessary for manufacturing interferometric modulators with smaller hysteresis windows. Accordingly, manufacturing costs may be decreased. In one embodiment, the width of a hysteresis window that has been optimized for ease of manufacturing may be in one of the ranges: 5.5-6.5 volts, 5-7 volts, or 3-12 volts. In one embodiment, an interferometric modulator optimized for ease of manufacturing has an optical stack comprising a partially reflective layer and an electrically conductive layer, wherein a central portion of an electrode layer is electrically isolated from peripheral portions of the electrode layer. In one embodiment, a surface area of the isolated central portion is at least about ⅓ of the total surface area of the electrode layer. An interferometric modulator with an electrode layer having an isolated central portion is discussed in further detail below with reference to FIG. 16B.

For ease of description, many embodiments of interferometric modulators having a movable reflective layer, such as the movable reflective layer 14 of FIG. 7A, are described herein. However, in some embodiments the mirror is not deformable, but is attached to a separate mechanism that allows the mirror to move within the cavity, such as the tethers 32 illustrated in FIG. 7B or the deformable layer 34 illustrated in FIG. 7C. In these embodiments, when the applied voltage reaches the actuation threshold, the separate mechanism allows the mirror to move into the cavity. The systems and methods described herein for optimizing interferometric modulators are equally applicable to other configurations of interferometric modulators, such as the interferometric modulators illustrated in FIGS. 7B and 7C.

In certain embodiments, the width and location of the hysteresis window of interferometric modulators may be adjusted by altering the physical characteristic of various components of the interferometric modulator. For example, by changing a stiffness of the movable mirror, the power required to deform the movable mirror may be reduced. Additionally, changes to other components of an interferometric modulator may also affect position and magnitude of the thresholds. In particular, adjusting a thickness (e.g., height), a width, and/or a distance between supports, such as supports 18 in FIG. 3, may alter the position and width of a hysteresis window corresponding to the adjusted interferometric modulator. Likewise, changing physical characteristics of the movable mirror and the optical stack may also affect the actuation and relax thresholds.

FIGS. 11-16 are cross sectional side views of exemplary interferometric modulators having one or more physical characteristic that are different than the exemplary interferometric modulator 700 of FIG. 7A. Thus, each of the interferometric modulators illustrated in FIGS. 11-16 may have hysteresis windows that are different than the hysteresis window illustrated in FIG. 3. The examples discussed below with respect to FIGS. 11-16 assume that only one feature of the interferometric modulator of FIG. 7A is adjusted. However, those of skill in the art will recognize that changes to multiple characteristics of an interferometric modulator may be made in order to achieve a desired hysteresis window. Thus, the modifications discussed with respect to FIGS. 11-16 are exemplary and do not limit the range of additional modifications that may be made to an interferometric modulator in order to adjust one or more of the actuation and relax thresholds.

Figure 11:
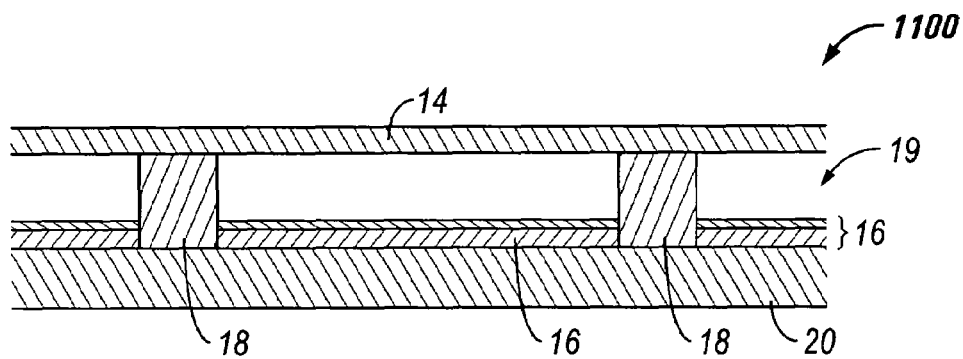
FIG. 11 is a cross sectional view of an exemplary interferometric modulator having supports with greater thicknesses than the supports in the interferometric modulator of FIG. 7A.

FIG. 11 is a cross sectional view of an exemplary interferometric modulator 1100 having supports with greater thicknesses (e.g., heights) than the supports in the interferometric modulator of FIG. 7A. As illustrated in FIG. 11, a gap 19 between the movable reflective layer 14 and the optical stack 16 has been increased over that of the interferometric modulator 700 (FIG. 7A) due to the increases support 18 thicknesses. In one embodiment, the increased distance between the movable reflective layer 14 and the optical stack 16 increases the actuation threshold of the interferometric modulator 1100, when compared to the interferometric modulator 700. In one embodiment, as the actuation threshold of an interferometric modulator changes, the relax threshold corresponding changes. Thus, with all other physical characteristics being equal, an interferometric modulator having higher supports than another interferometric modulator will typically have higher thresholds.

Figure 12:
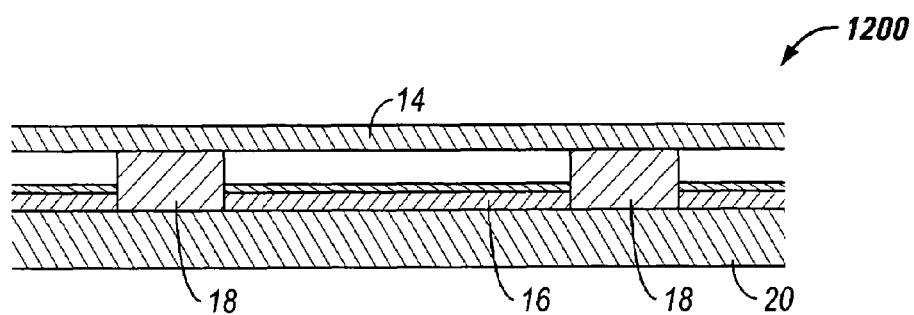
FIG. 12 is a cross sectional view of an exemplary interferometric modulator having supports with greater widths than the supports in the interferometric modulator of FIG. 7A.

FIG. 12 is a cross sectional view of an exemplary interferometric modulator 1200 having supports 18 with greater widths than the supports in the interferometric modulator 700 (FIG. 7A). Due to the increased mass of the supports 18, the thresholds for the interferometric modulator 1200 may be increased when compared to the thresholds of exemplary interferometric modulator 700. Thus, with all other physical characteristics being equal, an interferometric modulator having wider supports than another interferometric modulator will typically have higher thresholds.

Figure 13:
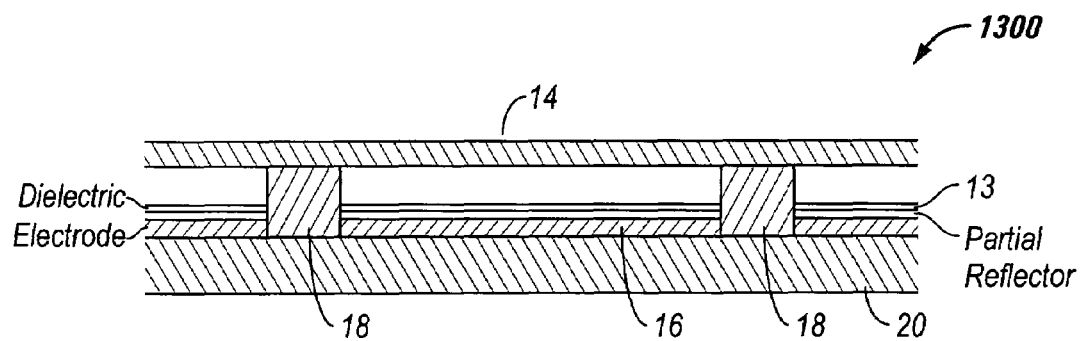
FIG. 13 is a cross sectional view of an exemplary interferometric modulator having a thinner dielectric layer than the dielectric layer in the interferometric modulator of FIG. 7A.

FIG. 13 is a cross sectional view of an exemplary interferometric modulator 1300 having a thinner dielectric layer than the dielectric layer in the interferometric modulator 700 (FIG. 7A). Although not specifically shown in FIG. 7A, the optical stack layer 16 may include a dielectric layer, partial reflector, and electrode, where the dielectric layer is positioned between the transparent conductor and the partial reflector in order to decrease a capacitance of the display element without changing a gap distance between the partial reflector and the movable mirror. FIG. 13 shows a dielectric layer 13 that is thinner than a dielectric layer of the interferometric modulator 700. By decreasing a thickness of this dielectric layer, an electrostatic force created between the movable reflective layer 14 and the optical stack 16 may be increased and, thus, the relax and actuation thresholds may be reduced. Therefore, with all other physical characteristics being equal, an interferometric modulator having a thinner dielectric layer than another interferometric modulator will typically have lower thresholds.

In one embodiment, the thresholds and/or hysteresis window of an interferometric modulator may be adjusted by using different dielectric materials. In general, the better a dielectric material is at trapping electrical charge in both polarities, the higher the thresholds and the lower the hysteresis window width. Thus, in one embodiment, selecting a dielectric material with an optimal positive and negative charge absorption characteristic optimizes the interferometric modulator for speed.

Figure 14:
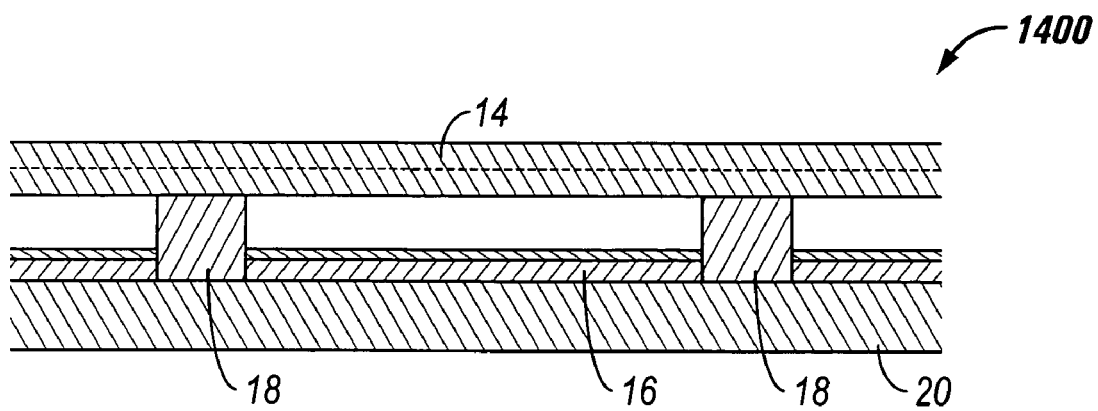
FIG. 14 is a cross sectional view of an exemplary interferometric modulator having a thicker moveable mirror than the moveable mirror in the interferometric modulator of FIG. 7A.

FIG. 14 is a cross sectional view of an exemplary interferometric modulator 1400 having a thicker moveable mirror 14 than the moveable mirror in the interferometric modulator 700 (FIG. 7A). Accordingly, in order to actuate, or relax, the moveable reflective layer 14, a larger applied voltage may be necessary. Thus, the actuation threshold of the interferometric modulator 1400 may be larger than the actuation threshold of exemplary interferometric modulator 700. Thus, with all other physical characteristics being equal, an interferometric modulator having a thicker moveable layer than another interferometric modulator will typically have higher thresholds.

Figure 15:
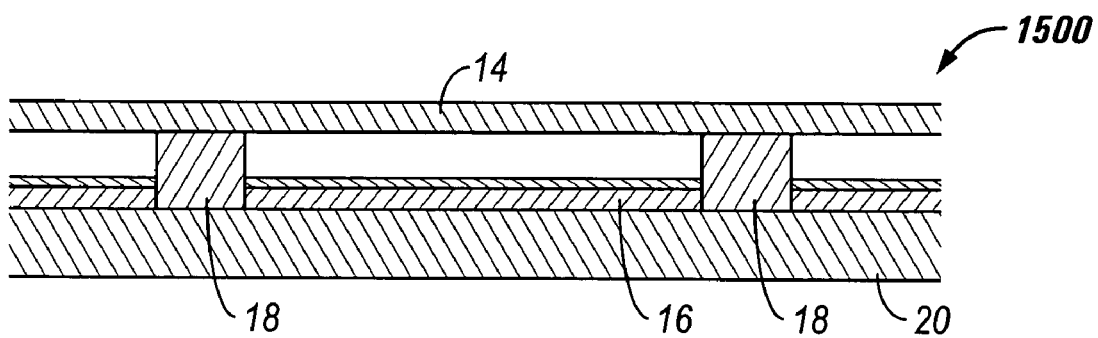
FIG. 15 is a cross sectional view of an exemplary interferometric modulator having a greater distance between supports when compared to the support positions in the embodiment of FIG. 7A.

FIG. 15 is a cross sectional view of an exemplary interferometric modulator 1500 having a greater distance between supports 18 when compared to the support positions of exemplary interferometric modulator 700 (FIG. 7A). Likewise, a width of the movable reflective layer 14 has also been increased. Accordingly, a force required to collapse the movable reflective layer 14 may be decreased and, thus, the actuation and relax thresholds may correspondingly be decreased from those of the interferometric modulator 700. In a similar manner, if the distance between the supports 18 is decreased, the actuation threshold may be increased. Thus, with all other physical characteristics being equal, an interferometric modulator having a greater distance between supports than another interferometric modulator will typically have lower thresholds.

Figure 16A:
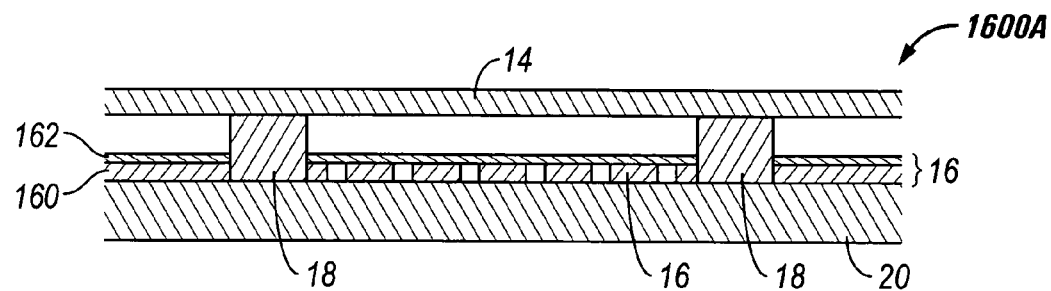
FIGS. 16A and B are cross sectional views of exemplary interferometric modulators having reduced electrically active areas when compared to the embodiment of FIG. 7A.
Figure 16B:
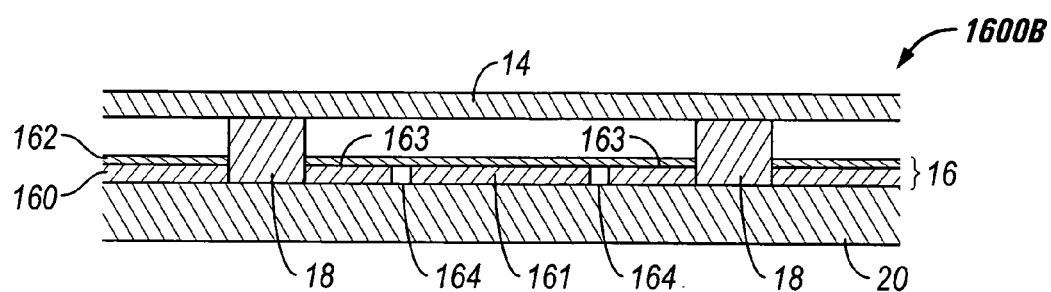

FIGS. 16A and 16B are cross sectional views of exemplary interferometric modulators 1600A, 1600B having optical stacks with reduced electrically active areas when compared to the embodiment of FIG. 7A. In the exemplary embodiment of FIGS. 16A and 16B, the optical stack 16 comprises an electrode layer 160 and a partially reflective layer 162. In other embodiments, the optical stack 16 may include more or fewer layers. As illustrated in FIG. 16A, the electrode layer 160 is patterned so that a total surface area of the electrode layer 160 is reduced when compared to a continuous electrode layer. For example, holes of various shapes and sizes may be punched through the electrode layer 160 in order to reduce the surface area of the electrode layer 160. Due to the reduced surface area of electrode layer 160, the thresholds for interferometric modulator 1600A are increased when compared to the thresholds of the interferometric modulator 700. Thus, with all other physical characteristics being equal, an interferometric modulator having a reduced electrically active area than another interferometric modulator will typically have higher actuation and relax thresholds.

In FIG. 16B, the electrode layer 160 is cut so that a central portion 161 is isolated from the peripheral portions 163. In the cross-sectional view of FIG. 16B, cuts 164 are illustrated which, in one embodiment, are portions of a circular cut in the electrode layer 160. In other embodiments, the shape and size of the isolated central portion 161 may be different than illustrated in FIG. 16B. In one embodiment, a surface area of the isolated central portion 161 is at least about ⅓ of the total surface area of the electrode layer 160.

In one embodiment, because the central portion 161 is electrically isolated from the peripheral portions 163, the central portion 161 does not contribute to the electrical field created by an applied voltage. Accordingly, the actuation threshold of the interferometric modulator 1600B is increased when compared to the interferometric modulator 700. However, because the peripheral portions 163 of the electrode layer 160 are primarily responsible for holding the interferometric modulator 1600B in the actuated position, the relax threshold of the interferometric modulator 1600B is not significantly different than the relax threshold of exemplary interferometric modulator 700. Therefore, with all other physical characteristics being equal, an interferometric modulator having an electrode layer including an electrically isolated central portion will have a higher actuation threshold than an interferometric modulator with a continuous electrode layer.

Figure 17A:
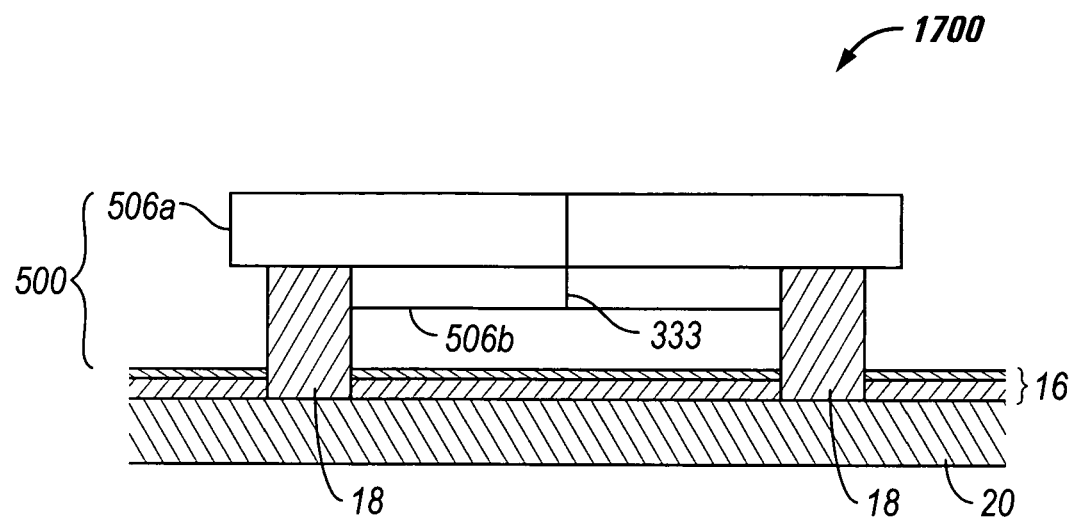
FIGS. 17A-17D illustrate an alternative embodiment of an interferometric modulator.
Figure 17B:
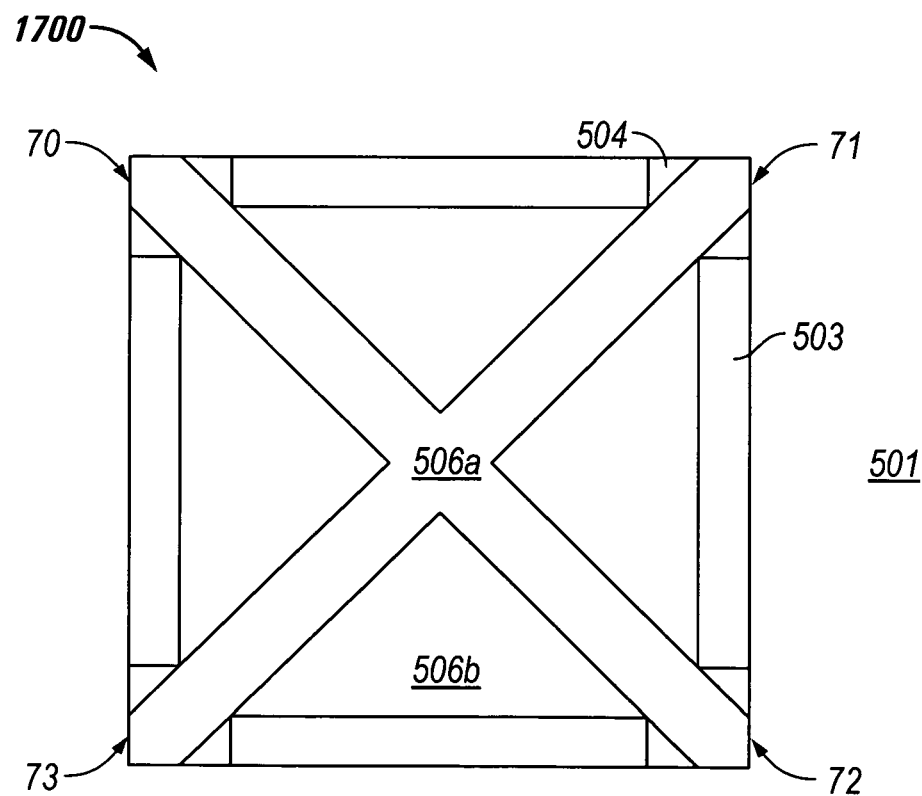
Figure 17C:
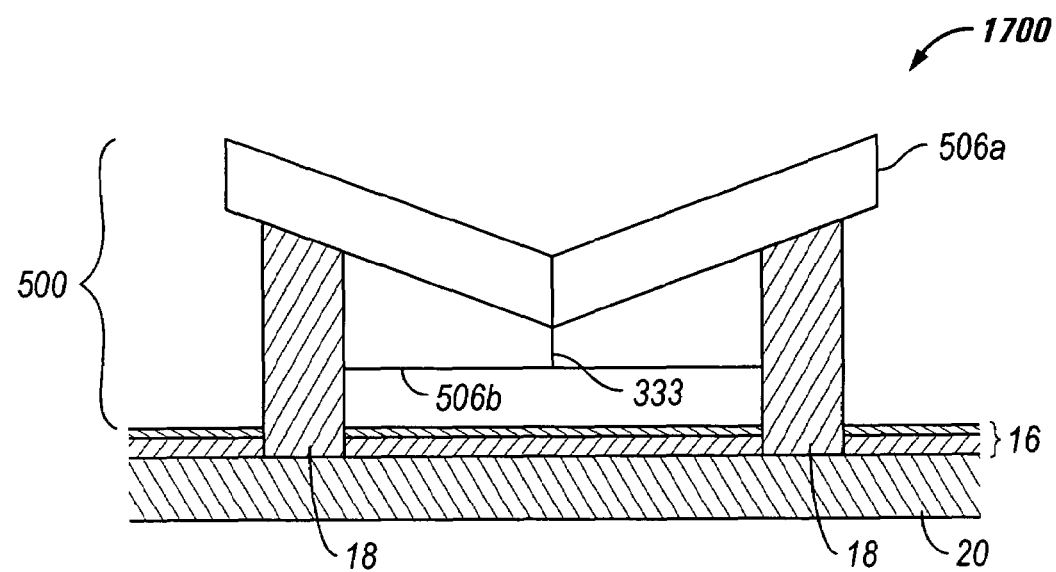
Figure 17D:
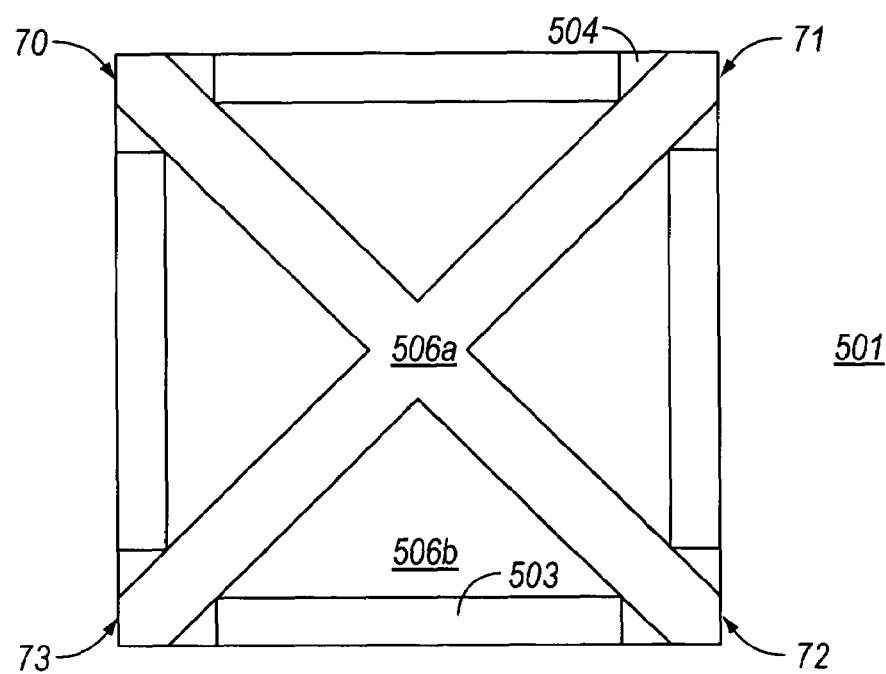

FIGS. 17A-17D illustrate an alternative embodiment of an interferometric modulator 1700. More particularly, FIGS. 17A and 17B illustrate side and top views, respectively, of the interferometric modulator 1700 in the relaxed state and FIGS. 17C and 17D illustrate side and top views, respectively, of the interferometric modulator 1700 in the actuated state. In the embodiment of FIGS. 17A-D, the mechanical layer 500 comprises a load bearing part 506a that is responsible for providing the flexibility and resilience for the movement of the mechanical layer through its elastic modulus, and a substantially planar part 506b, which functions as the moveable mirror for the interferometric modulator. The two parts 506a and 506b are connected to each other via a connecting element 333. In some embodiments, the connecting element 333, rather than the load bearing structure 506a, provides flexibility and resilience to the system. In some embodiments, the load bearing structure 506a is thicker than the moveable mirror 14 discussed in previous embodiments.

As shown in FIG. 17B, the load bearing part 506a is configured in an "X" shape that is supported in its four corners 70, 71, 72, and 73 to provide its elastomeric properties. In the driven state, the load bearing part 506a bends downward at its unsupported central portion towards the dielectric layer 503, thus moving the planar part 506b to towards the dielectric layer 503. Thus, the elastic modulus of the material, which is a constant based upon the material, may be adjusted in order to set the relax and/or actuation thresholds of an interferometric modulator. In general, as the elastic modulus of the load bearing part 506a increases, the thresholds correspondingly decrease.

In addition to adjustment of the physical characteristics described above with respect to FIGS. 11-17, other characteristics of an interferometric modulator may be adjusted in order to change a position and/or magnitude of a corresponding hysteresis window. Provided below is a table summarizing the above discussed physical characteristics, as well as other characteristics, that may be adjusted in order to alter the actuation and/or relax thresholds and, thus, alter the hysteresis window of interferometric modulators. Values for the below-listed physical characteristics may be selected in order to optimize power requirements, speed, and/or ease of manufacturing of an interferometric modulator. The following table presents only generalizations, and is not intended as a comprehensive list of adjustments that may affect a hysteresis window. Additionally, combinations of the below-listed adjustments to interferometric modulators may produce different results. Also, additional adjustments that are not listed below may be made to the interferometric modulators in order to affect the width and location of the hysteresis window.

| Adjustment to Interferometric Modulator | Effect on Width of Hysteresis Window | Effect on Location of Hysteresis Window | Exemplary relationship of adjustment to collapse and relax thresholds (collectively, "thresholds") |
|---|---|---|---|
| Decrease distance between supports | Increase | Increases Thresholds | About inversely proportional |
| Increase width of supports | Increase | Increases Thresholds | About proportional |
| Increase thickness of supports | Increase | Increases Thresholds | Thresholds increase by a factor of about the square root of the increase in thickness |
| Decrease electrically active portion of optical stack | Increase | Increases Thresholds | About inversely proportional |
| Increase stiffness of mechanical layer (e.g., moveable mirror and/or mechanism that moves moveable mirror) | Increases | Increases Thresholds | About proportional |
| Increase tensile stress of mechanical layer (e.g., moveable mirror and/or mechanism that moves moveable mirror) | Increases | Increases Thresholds | Thresholds increase by a factor of about the square root of the increase in tensile stress |
| Decrease dielectric constant of dielectric layer separating movable mirror and partial reflector | Increases | Decreases | |

The description of figures and the table above describe various modifications to components of an interferometric modulator in terms of "increasing" or "decreasing" a component dimension or value. In addition to the adjustments specifically described above, the systems and methods described herein expressly contemplate optimizing interferometric modulators by adjusting components dimensions or values in the opposite directions. For example, the above-table notes that an increase in the thickness of the supports results in an increase in the threshold values. Those of skill in the art will recognize that decreasing the thickness of the supports may also affect the thresholds. For example, in one embodiment, adjusting the component dimensions or values described above in an opposite direction (e.g, increasing rather than decreasing), has an opposite affect on the thresholds (e.g., if a threshold increases when a component value increases, a decrease in the component value causes the thresholds to decreases.). In some embodiments, changes to a component dimension or value in a first direction (e.g., increasing) have a larger affect on the thresholds than a change of the component dimension or value in the opposite direction (e.g., decreasing).

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the invention may be embodied within a form that does not provide all of the features and benefits set forth herein, as some features may be used or practiced separately from others.

What is claimed is:

1. A method of manufacturing an interferometric display element optimized for at least one of (a) low power consumption, (b) speed, and (c) ease of manufacturing, wherein the interferometric display element comprises a moveable reflective layer, a reflective element coupled to the moveable layer, a partially reflective layer, and a dielectric layer positioned between the moveable reflective layer and the partially reflective layer, the moveable reflective layer being suspended away from the partially reflective layer by one or more supports so as to define a cavity between the moveable reflective layer and the dielectric, the method comprising:

selecting one or more characteristics of at least one of a support thickness, a support width, a dielectric layer thickness, a moveable layer thickness, a moveable layer width, a moveable layer material, and a moveable layer stress level, wherein the selected one or more characteristics define one or more of an actuation threshold, a relax threshold, and a voltage difference between the actuation and relax thresholds of the interferometric display element; and manufacturing the interferometric display element to include the selected one or more characteristic.

2. An interferometric modulator manufactured by the process of:

selecting one or more characteristics of at least one of a support thickness, a support width, a dielectric layer thickness, a moveable layer thickness, a moveable layer width, a moveable layer material, and a moveable layer stress level, wherein the selected one or more characteristics define one or more of an actuation threshold, a relax threshold, and a voltage difference between the actuation and relax thresholds of the interferometric modulator; and manufacturing the interferometric modulator to include the selected one or more characteristics.

3. A method of defining characteristics for a hysteresis window of an interferometric display element, the method comprising:

selecting values for at least one of a thickness of a moveable layer portion of the display element, a thickness of a dielectric layer positioned between a moveable layer and a partially reflective layer, a spacing between supports configured to define a gap between the moveable layer and the partially reflective layer, and a gap distance between the moveable layer and the partially reflective layer, wherein a display element produced with said values exhibits said defined hysteresis window characteristics.

4. The method of claim 3, wherein the hysteresis window is optimized for low power consumption and wherein an actuation threshold is about 3.5 volts to 4.5 volts and a relax threshold is about 1.5 volts to 2.5 volts.

5. The method of claim 3, wherein the hysteresis window is optimized for speed and wherein an actuation threshold is about 7.5 volts to 8.5 volts and a relax threshold is about 5.5 volts to 6.5 volts.

6. The method of claim 3, wherein the hysteresis windows is optimized for ease of manufacturing and wherein an actuation threshold is about 7 volts to 9 volts and a relax threshold is about 1 volt to 3 volts.

7. A method of manufacturing an interferometric modulator to incorporate selected characteristics, the method comprising:

selecting values representative of interferometric modulator component characteristics, wherein the characteristics define an expected relax threshold and an expected actuation threshold of the interferometric modulator; and manufacturing the interferometric modulator by use of the selected values such that a relax threshold and an actuation threshold of the manufactured interferometric modulator are substantially equal to the expected relax and actuation thresholds, respectively.

8. The method of claim 7, wherein the component characteristics include at least one of a thickness of a dielectric layer positioned between a moveable layer and a partially reflective layer, a spacing between supports configured to define a gap between the moveable layer and the partially reflective layer, and a gap distance between the moveable layer and the partially reflective layer.

9. An interferometric modulator manufactured by the method as recited in claim 7.

10. A display element optimized for speed comprising:

a reflective moveable layer having a thickness in the range of about 2,500 to 5,000 Angstroms and a tensile stress in the range of about 350 to 700 MPascals;

a partially reflective layer;

a dielectric material positioned between the reflective moveable layer and the partially reflective layer; and supports positioned between the reflective moveable layer and the dielectric material and configured to define a gap between the reflective moveable layer and the partially reflective layer.

11. The display element of claim 10, wherein the reflective moveable layer comprises one of (a) a combination of Aluminum and Nickel alloy and (b) Aluminum.

12. The display element of claim 10, wherein the display element has an actuation threshold in the range of about 7.5 volts to 8.5 volts and a relax threshold in the range of about 5.5 volts to 6.5 volts.

13. A low power display element comprising:

a reflective moveable layer having a thickness in the range of about 800 to 1,500 Angstroms and a tensile stress in the range of about 50 to 350 MPascals;

a partially reflective layer;

a dielectric material positioned between the reflective moveable layer and the partially reflective layer; and supports positioned between the reflective moveable layer and the dielectric material and configured to define a gap between the reflective moveable layer and the partially reflective layer.

14. The display element of claim 13, wherein a distance between the supports is greater than about 40 microns.

15. The display element of claim 13, wherein the display element has an actuation threshold in the range of about 3.5 volts to 4.5 volts and a relax threshold in the range of about 1.5 volts to 2.5 volts.

16. A display element comprising:

a reflective moveable layer;

an optical stack comprising a partially reflective layer and an electrically conductive layer, wherein a center portion of the electrically conductive layer is electrically isolated from peripheral portions of the electrically conductive layer; and a dielectric material positioned between the reflective moveable layer and the partially reflective layer; and supports positioned between the reflective moveable layer and the dielectric material and configured to define a gap between the reflective moveable layer and the partially reflective layer.

17. The display element of claim 16, wherein a length of the center portion is greater than a length of at least one of the peripheral portions.

18. The display element of claim 16, wherein a thickness of the reflective moveable layer is in the range of about 800 to 1,500 Angstroms.

19. The display element of claim 16, wherein a tensile stress of the reflective moveable layer is in the range of about 50 to 350 MPascals.

20. The display element of claim 16, wherein the display element has an actuation threshold in the range of about 7 volts to 9 volts and a relax threshold in the range of about 1 volt to 3 volts.

21. An interferometric modulator comprising:

means for selecting values representative of interferometric modulator component characteristics, wherein the characteristics define an expected relax threshold and an expected actuation threshold of the interferometric modulator; and means for manufacturing the interferometric modulator by use of the selected values such that a relax threshold and an actuation threshold of the manufactured interferometric modulator are substantially equal to the expected relax and actuation thresholds, respectively.

22. An apparatus comprising:

a display comprising
- a reflective moveable layer having a thickness in the range of about 800 to 1,500 Angstroms and a tensile stress in the range of about 50 to 350 MPascals;
- a partially reflective layer;
- a dielectric material positioned between the reflective moveable layer and the partially reflective layer;
- supports positioned between the reflective moveable layer and the dielectric material and configured to define a gap between the reflective moveable layer and the partially reflective layer;

a processor that is in electrical communication with said display, said processor being configured to process image data; and a memory device in electrical communication with said processor.

23. The apparatus of claim 22, further comprising:

a driver circuit configured to send at least one signal to said display.

24. The apparatus of claim 23, further comprising:

a controller configured to send at least a portion of said image data to said driver circuit.

25. The apparatus of claim 22, further comprising:

an image source module configured to send said image data to said processor.

26. The apparatus of claim 25, wherein said image source module comprises at least one of a receiver, transceiver, and transmitter.

27. The apparatus of claim 26, further comprising:

an input device configured to receive input data and to communicate said input data to said processor.

* * * * *

UNITED STATES PATENT AND TRADEMARK OFFICE
CERTIFICATE OF CORRECTION

PATENT NO. : 7,310,179 B2  Page 1 of 1
APPLICATION NO. : 11/193012
DATED : December 18, 2007
INVENTOR(S) : Chui et al.

It is certified that error appears in the above-identified patent and that said Letters Patent is hereby corrected as shown below:

Title page, item [73] "Assignee:" please delete "Fancisco" and insert therefore, --Francisco--.

On page 2, column 2, line 41, after "4/1997" please delete "Rhoades" and insert therefore, --Rhoads--.

On page 3, column 2, line 49, please delete "Pichl" and insert therefore, --Piehl--.

At column 10, line 58, please delete "comers" and insert therefore, --corners--.

At column 18, line 36, please delete "e.g," and insert therefore, --e.g.,--.

Signed and Sealed this

Twentieth Day of January, 2009

JON W. DUDAS
*Director of the United States Patent and Trademark Office*